(No Model.)

E. D. MORIARTY.
RAILWAY TRACK JACK AND LINER.

No. 494,155. Patented Mar. 28, 1893.

Fig.1.

Fig.2.

Witnesses:—
Ed. F. Caldwell
A. M. Welch

Inventor:—
Edward D. Moriarty,
per Paul Merwin
Attorneys.

UNITED STATES PATENT OFFICE.

EDWARD D. MORIARTY, OF BROADLAND, SOUTH DAKOTA.

RAILWAY-TRACK JACK AND LINER.

SPECIFICATION forming part of Letters Patent No. 494,155, dated March 28, 1893.

Application filed February 23, 1892. Serial No. 422,351. (No model.)

*To all whom it may concern:*

Be it known that I, EDWARD D. MORIARTY, of Broadland, Beadle county, South Dakota, have invented a certain new and Improved Railway-Track Jack and Liner, of which the following is a specification.

My invention relates to improvements in devices designed for the raising of railway rails while the track is being ballasted and for "lining up" the rails upon the ties; its object being to provide a combination apparatus adapted for both these purposes in simple and inexpensive form.

To this end my invention consists in providing a flat sheet metal base which can be inserted between the ties underneath the rail, and have large bearing support upon the ground, and in mounting upon said base plate a pivoted lever, the fulcrum end of which is provided with a small anti friction roll adapted to bear upon the under side of the base of the rail so as to lift the same without moving it laterally. Pivoted to the fulcrum end of the lever is a dog or catch which is adapted to be lifted to engage the opposite edge of the base of the rail, so that when so desired the rail can be moved laterally by the throwing of the lever.

My invention further consists in the construction and combination hereinafter described and particularly pointed out in the claims.

In the accompanying drawings, forming part of this specification, Figure 1 is a plan view of the apparatus, and Fig. 2 is a side elevation of the same showing the manner in which it is applied to the rail.

In the drawings, 2 represents the sheet metal base having the upturned ends 4 to permit of its being readily slipped along the surface of the ground between the ties. Upon this base is secured the arched plate 6 for strengthening and stiffening the same, and upon the plate 6 are secured the standards 8, to receive the fulcrum pivot 10 of the lever A. The lever A is formed preferably of two members 12 and 14 made of flat iron bars, between the short or fulcrum ends of which is journaled the anti friction roll 16. Pivoted between the members 12 and 14, and between the roll 16 and the fulcrum pivot, is the toothed dog 18 which extends down through an opening in the plate 6, the teeth being adapted to engage the corner of the block 19 when raised, as shown best in Fig. 2. To this dog is attached one end of the rod 20 having the spring 22 tending to thrust it downward, its other end being connected to the bell crank lever 24, provided with the handle 26 which is adapted to be closed against the lever handle 28 in the ordinary manner, in order to release the dog from the block. Similarly pivoted between the members 12 and 14 on the opposite side of the pivot 10, is the dog 30, which is adapted to be turned downward and extend through openings in the plates 6 and 2, and in the depressing of the lever to be thrust into the ground beneath, so as to hold the device from slipping. When not in use the dog 30 may be turned upward and held between the members forming the lever, by means of the spur 32 carried by the spring 34 and extending through the opening 36 in the member 14, adapted to engage the socket 38 in the dog. Pivoted to the fulcrum end of the lever is also the yoke shaped catch or dog 40, having the hooks 42 on its outer end, which projects preferably a few inches beyond the roll 16.

Pivoted upon the side of the lever A is the lever 44, its fulcrum end being provided with an inturned point or catch 46, which projects under the dog 40, so that by depressing the lever 44, the dog 40 may be turned on its pivot and lifted into the position shown in Fig. 2.

Operation: When it is desired to merely lift the rail for ballasting the track, the lever A is thrown upward to depress its fulcrum end and the device slipped underneath the rail between the ties until the roller 16 comes squarely under the rail. By depressing the lever, the rail is then lifted to any desired height, the dog 18 automatically supporting it in such position, the roll 16 rolling upon the base of the rail so as to prevent its lateral displacement. When the ties have been ballasted, the dog is tripped by means of the handle 26, and the jack withdrawn. Where it is desired also to "line up" the rail or move it laterally, the jack is inserted beneath the rail from the side toward which it is desired to move the rail. The lever 44 is then operated to throw up the dog 40 into engagement with the base of the rail, as shown in Fig. 2.

The lever A being then depressed will lift, and also draw the rail toward it. Where the slope of the ground or the character of the soil is such that the jack slips from its position the dog 30 is turned downward, as shown in Fig. 2, so as to project through the base as the lever is depressed, and engaging with the soil beneath, prevents the slipping of the device.

I claim—

1. The combination of the plane surfaced base having upturned ends, the arch upon the same, the standard upon said arch, the lever pivoted to said standard, the stop or catch upon said base underneath said arch, the toothed dog for engaging said stop to support the fulcrum end of said lever in adjusted positions, and means for tripping said dog, substantially as described.

2. The combination with the base and the lever pivoted thereon, of the anti friction roll carried by the fulcrum end of said lever and adapted to bear upon the base of the rail, and the pivoted dog carried by said lever and adapted to engage the opposite edge of the base of the rail, whereby the device may be employed at will either to lift the rail vertically, or to carry it upward and outward, substantially as described.

3. The combination with the base and the lever pivoted thereon, of the dog pivoted to the power end of the lever and projecting downward through said base, substantially as described.

4. The combination with the base and the lever pivoted thereon, of the dog or catch pivoted to the fulcrum end of said lever and adapted to engage the opposite edge of the base of the rail, substantially as described.

5. The combination of the base, the bell crank lever pivoted thereon, the pivoted dog carried by the power end of said lever and projecting downward through said base, the toothed dog pivoted to the fulcrum end of said lever and engaging said base, means for tripping said toothed dog to release it from engagement with said base, the anti friction roll journaled on the fulcrum end of said lever, the catch pivoted to the fulcrum end of said lever and adapted to engage the base of the rail, and the pivoted lever engaging said catch and adapted to lift the same into contact with said rail, substantially as described.

6. The combination with the base and the bell crank lever pivoted thereon, the fulcrum end of which is adapted to be brought into contact with the base of the rail, of automatic means for supporting said fulcrum end in adjusted positions, and means operated by said lever for engaging the ground upon which the base rests, so as to prevent its slipping thereon, substantially as described.

7. The combination with the base, and the bell crank lever pivoted thereon, of automatic means for supporting the fulcrum end of said lever in adjusted positions, means operated by said lever for engaging the ground to prevent the device from slipping, and means carried by the fulcrum end of said lever whereby said rail may be engaged and moved laterally, substantially as described.

8. The combination with the base and the lever pivoted thereon, of the dog or catch pivoted to the fulcrum end of said lever, and the pivoted lever adapted to engage said dog and to lift it into engagement with the opposite edge of the base of the rail, substantially as described.

In testimony whereof I have hereunto set my hand this 17th day of February, 1892.

EDWARD D. MORIARTY.

In presence of—
ED. BARROWS,
J. S. HUSTON.